United States Patent [19]

Yamamori et al.

[11] 4,307,628
[45] * Dec. 29, 1981

[54] AUTOMATIC POWER TRANSMISSION FOR TRANSVERSE ENGINE FOR FRONT-DRIVE VEHICLE

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[*] Notice: The portion of the term of this patent subsequent to Sep. 23, 1997, has been disclaimed.

[21] Appl. No.: 39,494

[22] Filed: May 16, 1979

Related U.S. Application Data

[63] Continuation-in-part of Ser. No. 946,938, Sep. 29, 1978, abandoned.

[30] Foreign Application Priority Data

Sep. 18, 1978 [JP] Japan .................. 53-114939

[51] Int. Cl.³ .................. F16H 57/02; F16H 37/08
[52] U.S. Cl. .................. 74/606 R; 74/410; 74/695
[58] Field of Search .................. 74/410, 606 R, 695, 74/730, 732, 752 A, 752 C, 760

[56] References Cited

U.S. PATENT DOCUMENTS

| | | | |
|---|---|---|---|
| 1,306,157 | 6/1919 | Smith | 74/410 |
| 1,973,554 | 9/1934 | Bentley | 74/424.5 |
| 2,345,733 | 4/1944 | Day | 74/410 |
| 2,659,240 | 11/1953 | Rubbra et al. | 74/410 |
| 3,176,532 | 4/1965 | Luenberger | 74/410 |
| 3,274,848 | 9/1966 | Konrad et al. | 74/731 |
| 3,614,902 | 10/1971 | Candellero | 74/730 |
| 3,800,626 | 4/1974 | Koivunen | 74/695 |
| 3,802,294 | 4/1974 | Smirl | 74/682 |
| 3,916,727 | 11/1975 | Piret | 74/730 |
| 4,151,761 | 5/1979 | Nishikawa et al. | 74/606 A |
| 4,223,566 | 9/1980 | Yamamori et al. | 74/695 |

*Primary Examiner*—Lawrence J. Staab
*Attorney, Agent, or Firm*—Thompson, Birch, Gauthier & Samuels

[57] ABSTRACT

An automotive automatic power transmission system having a torque converter contained in a converter housing and a planetary gear system powered by the torque converter. The planetary gear system is contained in a gear housing detachably secured to the converter housing. The planetary gear system has an output shaft carrying an output gear meshing with an idler gear which is in turn in meshed relationship with a driven gear of a final drive unit. The aforesaid gears are of the helical type and are rotatable about parallel axes, with a resulting axial thrust on the output shaft in a direction towards the planetary gear system during rotation of the output gear in the forward direction. The output shaft is journalled between first and second thrust bearings, with the first thrust bearing being carried on a hollow member detachably fixed to the converter housing and protruding axially therein to support the torque converter stator on a one-way clutch. The second thrust bearing is radially and axially supported exclusively by the converter housing and is provided with a loading capacity greater than that of said first bearing.

8 Claims, 4 Drawing Figures

AUTOMATIC POWER TRANSMISSION FOR TRANSVERSE ENGINE FOR FRONT-DRIVE VEHICLE

RELATED APPLICATION

This application is a continuation-in-part of U.S. Application Ser. No. 946,938 filed Sept. 29, 1978, now abandoned.

DESCRIPTION OF INVENTION

The present invention relates in general to an automotive automatic power transmission which is designed and constructed to be transversely mounted on a F—F type motor vehicle in which an engine such as an internal combustion engine is transversely mounted at the front of the vehicle with drive to the front wheels. More specifically, the present invention is concerned with an arrangement and construction of an output gear train of the power transmission of the type mentioned above by which not only reduction of overall longitudinal length of the transmission but also reliable transmittance of the revolution of the power output shaft of the transmission to a final drive unit mounted beside the transmission are achieved.

It is an object of the present invention to provide an improved and new automotive automatic power transmission, for a transverse engine, having a reduced overall longitudinal length.

It is another object of the present invention to propose an improved and new arrangement and construction of an output gear train of an automatic power transmission by which the revolution of the power output shaft of the transmission is reliably and effectively transmitted to the final drive unit which is mounted beside the transmission.

According to the present invention, there is provided a power transmission system having a torque converter contained in a converter housing, a planetary gear system powered by the torque converter, the planetary gear system being contained in a gear housing detachably secured to the converter housing, the planetary gear system having an output shaft carrying an output gear meshing with an idler gear which is in turn in meshed relationship with a driven gear of a final drive unit, with the improvement comprising: said gears being of the helical type and being rotatable about parallel axes, with a resulting axial thrust on the output shaft in a direction towards the planetary gear system during rotation of the output gear in the forward direction, said output shaft being journalled between first and second thrust bearings, said first thrust bearing being carried on a hollow member detachably fixed to the converter housing and protruding axially therein to support the torque converter stator on a one-way clutch, said second thrust bearing being radially and axially supported exclusively by said converter housing and having a loading capacity greater than that of said first bearing.

Other objects and advantages of the present invention will become clear from the following description when taken in conjunction with the accompanying drawings, in which:

Figure 1A:
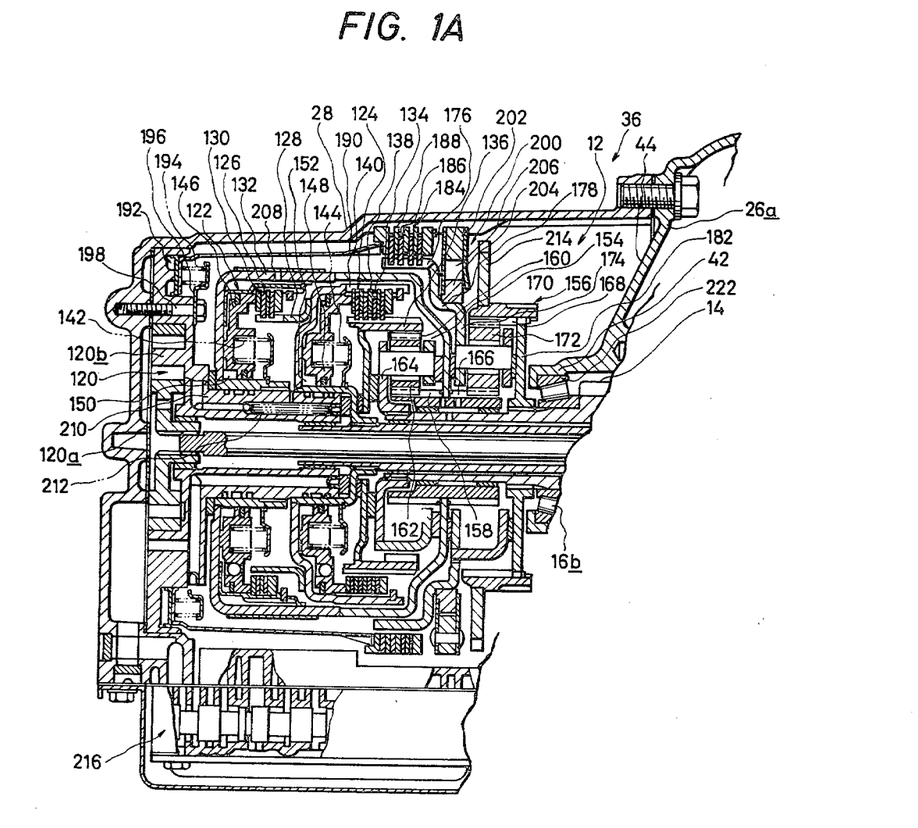
FIGS. 1A and 1B in combination provide a longitudinal sectional view of a transversely mounted type automatic power transmission and a final drive unit including a differential gear assembly, to which the present invention is applied, the final drive unit being shown moved from the proper position of it for clearness.
Figure 1B:
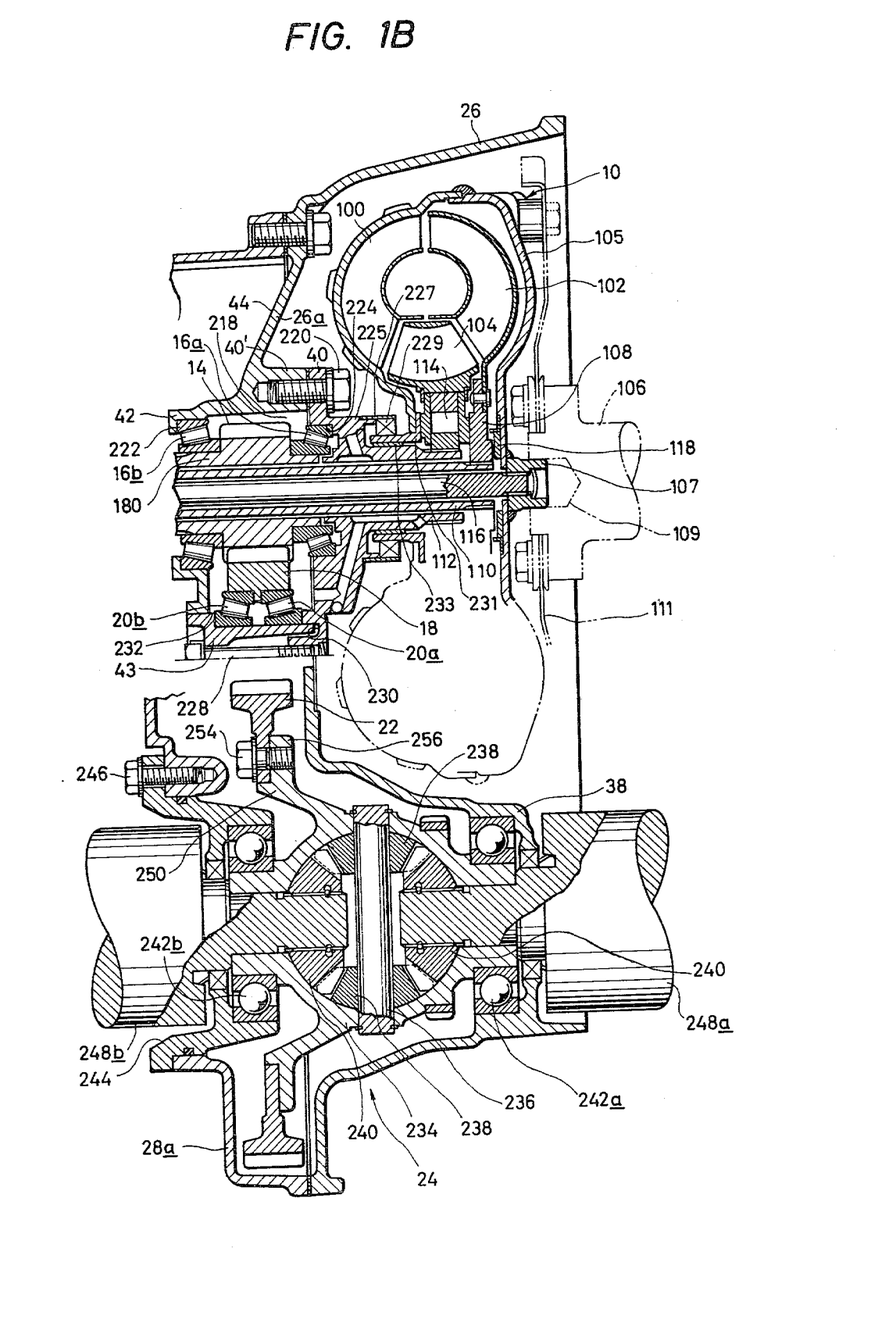
Figure 2:
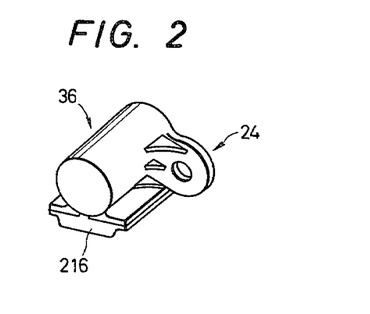
FIG. 2 is a sketch depicting the positional relationship between the transmission and the final drive unit.

Referring to FIGS. 1A, 1B and 2, there is illustrated a transversely mounted type automatic power transmission and a final drive unit which are generally denoted by numerals 36 and 24, respectively, to which unit the present invention is applied.

The transmission 36 comprises the converter housing 26 within which the torque converter assembly 10 is housed. The torque converter assembly 10 comprises a pump impeller 100, a turbine runner 102, and a stator 104 as is well known in the art. The pump impeller 100 is connected via a converter cover 105 and a drive plate 111 to a crankshaft 106 of a power plant such as an internal combustion engine (not shown) and is rotatable with the crankshaft 106 about an axis which is aligned with the axis of rotation of the crankshaft 106. Denoted by 107 is a pilot element which is secured to a central portion of the converter cover 105 and is received in a central bore 109 of the crankshaft 106, as shown. The turbine runner 102 is mounted on a hub 108 which in turn is keyed or splined to a transmission hollow input shaft 110 which has a center axis aligned with the axis of rotation of the engine crankshaft 106. The stator 104 is positioned between the pump impeller 100 and the turbine runner 102 and is mounted on a hollow stator support shaft 112 through a torque converter one-way clutch assembly 114. The hollow stator support shaft 112 has the hollow transmission input shaft 110 axially passed therethrough in substantially coaxial relationship and is fixedly but detachably connected through a flange portion 40 formed thereon to a base wall 26a of the converter housing 26, as will hereinafter be described in more detail. The stator 104 is permitted to rotate about the center axis of the input shaft 110 in the same direction as the direction of the pump impeller 100 and accordingly as the direction of rotation of the engine crankshaft 106. An oil pump driving shaft 116 is rotatably and concentrically received in the input shaft 110 and has a right-hand end (as viewed in FIG. 1B) to which a hub 118 of the converter cover 105 is splined or keyed. As will be well understood hereinafter, a left-hand end of the oil pump driving shaft 116 is keyed with a drive gear 120a of a transmission oil pump assembly 120 which has an oil pump body 120b bolted or otherwise secured to a stationary wall structure of the gear unit housing 28 of the transmission 36.

When the engine is in operation, the driving power produced by the engine is delivered from the engine crankshaft 106 to the pump impeller 100 through the converter cover 105 and is transmitted from the pump impeller 100 to the hollow transmission input shaft 110 through the turbine runner 102 with a torque multiplied by means of the stator 104 at a ratio which is variable with the ratio between the speed of revoltuion of the engine crankshaft 106 and that of the input shaft 110. The pump impeller 100 drives not only the turbine runner 102 but also the transmission oil pump assembly 210 through the oil pump driving shaft 116 so that the oil pump assembly 120 delivers oil under pressure which is also variable with the revolution speed of the crankshaft 106 of the engine.

On the left side of the torque converter assembly 10, as shown in FIG. 1A, is positioned the gear unit 12 of the transmission 36. The unit 12 is arranged between the torque converter assembly 10 and the oil pump assembly 120 and is housed in the gear unit housing 28, which is detachably secured to the converter housing 26. The gear unit 12 comprises first and second or high-and-reverse and forward drive clutches 122 and 124 which are positioned in a manner that the high-and-reverse clutch 122 is located between the oil pump assembly 120 and the forward drive clutch 124. The high-and-reverse clutch 122 comprises a plurality of plates 126 keyed or splined at their inner peripheral edges to a clutch hub 128 and plates 130 keyed or splined at their outer peripheral edges to a first clutch drum 132 which is in part positioned between the clutches 122 and 124 as shown. Likewise, the forward drive clutch 124 comprises a plurality of plates 134 keyed or splined at their inner peripheral edges to a clutch hub 136 and plates 138 keyed or splined at their outer peripheral edges to a second clutch drum 140. The clutch hub 128 for the high-and-reverse clutch 122 and the second clutch drum 140 for the forward drive clutch 124 are secured to each other and rotatable with the output shaft 110 with the second clutch drum 140 keyed or splined at its inner peripheral portion to a left end portion of the transmission hollow input shaft 110. The plate 126 of the high-and-reverse clutch 122 and the plates 138 of the forward drive clutch 124 thus serve as driving friction elements and, accordingly, the plates 130 of the high-and-reverse clutch 122 and the plates 134 of the forward drive clutch 124 serve as driven friction elements in the clutches 122 and 124, respectively. Return springs 142 and 144 are respectively incorporated with the high-and-reverse clutch 122 and the forward drive clutch 124 to urge the clutches 122 and 124 to be disengaged, respectively. Clutch pistons 146 and 148 are respectively incorporated with the high-and-reverse clutch 122 and the forward drive clutch 124 respectively for bringing the clutches 122 and 124 into engagement when moved by a fluid fed into respective fluid chambers 150 and 152 which are formed between the clutch piston 146 and the first clutch drum 132 and between the clutch piston 148 and the second clutch drum 140, respectively, as shown.

The unit 12 further comprises first and second planetary gear assemblies 154 and 156 which are arranged at the right of the forward drive clutch 124. The first planetary gear assembly 154 comprises an externally toothed sun gear 158 and an internally toothed ring gear 160 which have a common axis of rotation aligned with the center axis of the input shaft 110. The ring gear 160 is formed on the clutch hub 136 for the forward drive clutch 124. The first planetary gear assembly 154 further comprises at least two planet pinions 162 each of which is in mesh with the sun and ring gears 158 and 160 and which is rotatable about an axis around the common axis of rotation of the sun and ring gears 158 and 160. The planet pinions 162 of the first planetary gear assembly 154 are jointly connected to a pinion carrier 164. The second planetary gear assembly 156 is constructed similarly to the first planetary gear assembly 154 and thus comprises an externally toothed sun gear 166 and an internally toothed ring gear 168 which have a common axis of rotation aligned with the center axis of the transmission hollow input shaft 110. The sun gear 166 is formed integral with the sun gear 158 of the first planetary gear assembly 154. The sun gears 158 and 166 of the first and second planetary gear assemblies 154 and 156, respectively, are jointly splined to a connecting shell 170 which encloses the forward drive clutch 124 and the first planetary gear assembly 154 and is securely connected to the first clutch drum 132 for the high-and-reverse clutch 122. The second planetary gear assembly 156 further comprises at least two planet pinions 172 each of which is in mesh with the sun and ring gears 166 and 168 and which is rotatable about an axis around the common axis of rotation of the sun and ring gears 166 and 168. The planet pinions 172 of the second planetary gear assembly 156 are jointly connected to a pinion carrier 174 having a drum portion 176 which leftwardly extends to enclose in part the connecting shell 170 therein, as shown. By the reason which will become clear from the later, the drum portion 176 of the pinion carrier 174 has a circular step portion 178. The respective sun gears 158 and 166 of the first and second planetary gear assemblies 154 and 156 are formed with center bores through which a transmission hollow output shaft 180 having a center axis aligned with the center axis of the input shaft 110 is passed and axially extends toward the torque converter assembly 10. The output shaft 180 thus coaxially receives therein the input shaft 110, as shown. The output shaft 180 has a left end to which the pinion carrier 164 for the first planetary gear assembly 154 is splined at its inner peripheral edge and has an intermediate portion to which the ring gear 168 for the second planetary gear assembly 156 is connected through a generally disc shaped connecting member 182 which is keyed or splined at its inner peripheral edge to the intermediate portion of the output shaft 180 and at its outer peripheral edge to the ring gear 168. Concentrically mounted around the drum portion 176 of the pinion carrier 174 for the second planetary gear assembly 156 is a low-and-reverse brake 184. This brake 184 comprises a plurality of plates 186 keyed or splined at their inner peripheral edges to the drum portion 176 for the second planetary gear assembly 156, and a plurality of plates 188 which are keyed or splined at their outer peripheral edges to an intermediate portion of the inner wall of the gear unit housing 28. The low-and-reverse brake 184 further has a drum shaped piston 190 which is concentrically mounted around the first clutch drum 132 for the high-and-reverse clutch 122 and engages at its right end to the leftmost member of the plates 186 and 188. The left end portion of the piston 190 is sealingly disposed in a fluid chamber 192 into which a fluid under pressure is fed to move the piston 190 rightwardly urging the plates 186 and 188 of the brake unit 184 to be engaged with one another against a biasing force developed by a return spring 194 which is interposed between the left end portion of the piston 190 and a spring retainer 196 fixed to the gear unit housing 28 via bolts 198. As shown, the fluid chamber 192 is formed at the leftmost portion of the gear unit 12, more specifically at the portion just around the oil pump assembly 120. The low-and-reverse brake 184 is paralleled in effect by a transmission one-way clutch 200 which is positioned around the before-mentioned drum portion 176 for the second planetary gear assembly 156 and comprises a stationary outer race member 202, a rotatable inner race member 204 and a series of spring loaded rollers 206 disposed between the outer and inner race members 202 and 204. The stationary outer race member 202 is splined to the inner wall of the gear unit housing 28. On the other hand, the rotatable inner race member 204 is securely disposed on the before-mentioned circular step portion 178 of the drum portion 176 for the second planetary gear assembly 56. The rollers 206 are arranged in a manner to be caused to stick to the outer and inner race members 202 and 204 and thereby lock up the rotatable inner race member 204 to the stationary outer race member 202 when the inner race member 204 is urged to turn about the center axis of the output shaft 180 in a direction opposite to the direction of rotation of the engine crankshaft 106, viz, to the direction of rotation of the output shaft 180 to produce a forward drive mode of an automotive vehicle. The gear unit 12 of the transmission 36 further comprises a brake band 208 which wrappes the cylindrical outer surface of the first clutch drum 132 for the high-and-reverse clutch 122. Although not shown, the brake band 208 is anchored at one end to the gear unit housing 28 and is at the other end connected to or engaged by a conventional fluid operated band servo unit (not shown). Although, not shown in the drawing, a conventional transmission governor assembly connected to the transmission hollow output shaft 180 is mounted in the gear unit housing 28 in the vicinity of the ring gear 168 of the second planetary gear assembly 156 in such a manner that primary and secondary governor valves thereof are arranged in diametrically opposed relationship to each other across the center axis of the output shaft 180. The housing of the before-mentioned oil pump assembly 120 has a rightwardly extending sleeve shaft portion 210 in which a fluid passage 212 for lubrication fluid for the clutch assemblies 122 and 124 is formed. Indicated by numeral 214 is a parking gear which is secured on the ring gear 168 for the second planetary gear assembly 156, forming part of a parking lock assembly to lock the output shaft 180 by the aid of a parking pawl (not shown) meshing with the parking gear 214 during parking of the vehicle. Indicated generally by numeral 216 is a hydraulic control valve unit by which the gear unit 12 is controlled.

TABLE 1

| | Clutches | | | | Brake band (208) | |
|---|---|---|---|---|---|---|
| Range | High-and-reverse (122) | Forward drive (124) | Low & reverse brake (184) | One way clutch (200) | Applied | Released |
| "P" | | | 0 | | | |
| "R" | 0 | | 0 | | | 0 |
| "N" | | | | | | |
| Drive "D₁" | | 0 | | 0 | | |
| "D₂" | | 0 | | | 0 | |
| "D₃" | 0 | 0 | | | (0) | 0 |
| "2" | | 0 | | | 0 | |
| "1" | | 0 | 0 | | 0 | |

The high-and-reverse and forward drive clutches 122 and 124, the low-and-reverse brake 184, one-way clutch 200 and brake band 208 of the transmission mechanism or the gear unit 12 having the construction hereinbefore described are operated in accordance with schedules indicated in Table 1.

In Table 1, the sign "O" indicates that for each of the high-and-reverse, forward-drive and one-way clutches 122, 124 and 200 clutch in question is in a coupled condition and for the low-and-reverse brake 184 the brake is in a condition applied. As to the brake band 208, the sign "O" in the column under "Applied" indicates that the brake band 208 is actuated to lock up the first clutch drum 132 and the sign "O" in the column under "Released" indicates that the brake band 208 is released from the first clutch drum 132. The sign "O" enclosed in the parentheses means that there is a fluid pressure developed in the brake-apply chamber of the servo unit (not shown) but the brake band 208 is released from the first clutch drum 132 with a fluid pressure also developed in the brake-release chamber of the servo unit.

The parking, reverse drive and neutral gear ranges and the automatic forward drive and manual second and first forward drive ranges as indicated in the leftmost column of Table are selectively established in the transmission mechanism by manipulating a manual selector lever (not shown) which has positions "P", "R", "N", "D", "2" and "1" respectively corresponding to the above-mentioned gear ranges.

When now the selector lever is in the parking range "P" or the neutral range "N", both of the high-and-reverse and forward drive clutches 122 and 124 are held in the uncoupled condition thereof so that the driving connection between the input and outpus shafts 110 and 180 is interrupted and as a consequence the output shaft 180 is maintained at rest even though the engine is in operation delivering its power output from the crankshaft 106. Under these conditions, either the parking range or the neutral range is established in the transmission mechanism depending upon whether the transmission gear shift lever is held in the parking range "P" or in the neutral range "N". If the selector lever is in the parking range "P", the low-and-reverse brake 184 is held in the condition applied so that the drum portion 176 and accordingly the pinion carrier 174 of the second planetary gear assembly 156 are locked to the gear unit housing 28. During parking of the vehicle, the parking gear 214 mounted on the ring gear 168 for the second planetary gear assembly 156 is captured by the parking pawl (not shown) of the before-mentioned parking lock assembly so that the output shaft 180 is locked up to the gear unit housing 28.

When the manual lever is moved into the automatic forward drive range "D" with the engine operating, the forward drive clutch 124 is caused to couple. The power output delivered from the crankshaft 106 of the engine to the input shaft 110 through the torque converter assembly 10 is transmitted through the forward drive clutch 124 and the clutch hub 136 to the ring gear 160 of the first planetary gear assembly 154. The ring gear 160 is driven to rotate in the forward direction about the center axis of the output shaft 180 and thereby causes the sun gear 158 to rotate in the opposite direction about the center axis of the output shaft 180 through the planet pinions 162 each of which is rotated in the same direction as the ring gear 160 about its own axis of rotation. The sun gear 166 of the second planetary gear assembly 156, which is integral with the sun gear 158 of the first planetary gear assembly 154, is rotated in the opposite or reverse direction about the center axis of the output shaft 180 and causes the ring gear 168 of the second planetary gear assembly 156 to turn in the forward direction about the center axis of the output shaft 180. Under these conditions, the individual planet pinions 172 of the second planetary gear assembly 156 are caused to rotate in the forward direction about the respective axes of rotation thereof and therefore attempt to turn in the reverse direction about the center axis of the output shaft 180. The revolution of the pinion carrier 174 of the second planetary gear assembly 156 is, however, prohibited by the one-way clutch 200 connected to the pinion carrier 174, more specifically to the step portion 178 of the drum portion 176 with the result that the pinion carrier 174 is locked to the gear unit housing 28 and acts as reaction elements for the ring gear 168 which drives via the disc-shaped connecting member 182 the output shaft 180 to rotate in the forward direction about the center axis thereof. The output shaft 180 is connected to the pinion carrier 164 of the first planetary gear assembly 154 so that each of the planet pinions 162 is rotated about the center axis of the transmission hollow output shaft 180 in the same direction as the direction of rotation of the ring gear 160 of the first planetary gear assembly 154 but at a revolution speed which is lower with a certain ratio than the revolution speed of the ring gear 160 on which the planet pinions 162 are rolling, thereby creating the first forward speed or "low" gear ratio ($D_1$) in the transmission mechanism.

If the vehicle is thereafter speeded up and the vehicle speed reaches a certain level, the band servo unit for the brake band 208 is actuated by a fluid distributed into the brake-apply fluid chamber of the servo unit and causes the brake band 208 to be tightened around the first clutch drum 132 which is connected via the connecting shell 170 to the integral first and second sun gears 158 and 166 for the first and second planetary gear assemblies 154 and 156. The sun gear 158 of the first planetary gear assembly 154 now acts as a reaction element for the planet pinions 162 which are being driven to turn in the forward direction about the center axis of the output shaft 180 by the ring gear 160 rotating with the input shaft 110 through the forward drive clutch 124 which is kept coupled. The driving torque carried over to the ring gear 160 of the first planetary gear assembly 154 through the forward drive clutch 124 is therefore transmitted to the output shaft 180 by means of the planet pinions 162 and the associated pinion carrier 164. Under these conditions, the individual planet pinions 162 of the first planetary gear assembly 154 are caused to rotate in the forward direction about the respective axes of rotation thereof and thus roll on the ring gear 160 while rotating in the forward direction about the center axis of the output shaft 180. The output shaft 180 is thus rotated in the forward direction about the center axis thereof at a speed higher than that achieved under the first forward speed of "low" gear ratio ($D_1$) but lower with a certain ratio than the revolution speed of the ring gear 160 of the first planetary gear assembly 154, thereby producing the second forward speed or intermediate ratio ($D_2$) in the transmission mechanism. Under the second forward speed thus established, the output shaft 180 drives the ring gear 168 of the second planetary gear assembly 156 to rotate in the forward direction about the center axis of the output shaft 180 and thereby causes the planet pinions 172 to turn about the center axis of the output shaft 180 in the same direction as the direction of rotation of the ring gear 168. Thus, the pinion carrier 174 of the second planetary gear assembly 156 and accordingly the drum portion 176 are also rotated in the forward direction about the center axis of the output shaft 180 and cause the inner race member 204 of the transmission one-way clutch 200 to run idle within the outer race member 202 of the one-way clutch 200.

As the vehicle speed further increases, a fluid is distributed into the brake-release fluid chamber of the band servo unit for the brake band 208 and causes the brake band 208 to be released from the first clutch drum 132 and, substantially at the same time, the high-and-reverse clutch 122 is actuated to couple. The power output delivered from the crankshaft 106 of the engine to the input shaft 110 is now transmitted on one hand to the integral first and second sun gears 158 and 166 of the first and second planetary gear assemblies 154 and 156 through the high-and-reverse clutch 122 and the first clutch drum 132 released from the brake band 208 and on the other hand to the ring gear 160 of the first planetary gear assembly 154 by way of the forward drive clutch 124 and the clutch hub 136. It therefore follows that the sun gear 158 and the ring gear 160 for the first planetary gear assembly 154 are locked together so that the sun and ring gears 158 and 160 and the planet pinions 162 therebetween as well as the output shaft 180 connected to the planet pinion 162 by the pinion carrier 164 are driven to rotate as a single unit in the forward direction about the center axis of the output shaft 180. The output shaft is thus rotated in the forward direction about the center axis thereof at a speed substantially equal to the revolution speed of the input shaft 110, thereby providing the third forward speed or "high" gear ratio ($D_3$) in the transmission mechanism. Under the third forward drive speed thus established, the input shaft 110 driven by the turbine runner 102 of the torque converter 10 is rotated at a speed substantially equal to the revolution speed of the engine crankshaft 106 driving the pump impeller 100 of the converter 10 and, as a consequence, there occurs no torque multiplication by the torque converter 10, which thus functions merely as a fluid coupling.

When the manual selector lever is moved into the reverse drive range "R". The high-and-reverse clutch 122 and the low-and-reverse brake 184 are actuated in the transmission mechanism. With the high-and-reverse clutch 122 thus coupled, the power output delivered from the crankshaft 106 of the engine to the input shaft 110 by way of the torque converter 10 is transmitted through the high-and-reverse clutch 122, first clutch drum 132 and connecting shell 170 to the sun gears 158 and 166 of the first and second planetary gear assemblies 154 and 156, respectively, causing the sun gears 158 and 166 to rotate in the forward direction about the center axis of the output shaft 180. The low-and-reverse brake 184 is being actuated to lock the drum portion 176 and thus the pinion carrier 174 for the second planetary gear assembly 156 is held stationary with respect to the gear unit housing 28, with the result that the planet pinions 172 of the second planetary gear assembly 156 are driven by the sun gear 166 for rotation in the reverse direction about the center axis of the output shaft 180. This causes the output shaft 180 to rotate in the reverse direction about the center axis thereof at a speed which is lower with a certain ratio than the revolution speed of the sun gears 158 and 166 of the first and second planetary gear assemblies 154 and 156 and accordingly of the input shaft 110, establishing the reverse drive range "R" in the transmission mechanism.

When the selector lever is in the manual second forward drive range "2", the forward drive clutch 124 and the brake band 208 are actuated and, as a consequence the output shaft 180 is driven to rotate in the forward direction about the center axis thereof by means of the pinion carrier 164 of the first planetary gear assembly 154 as in the second forward drive ($D_2$) produced with the selector lever held in the automatic forward drive range "D".

Under the condition in which the selector lever is held in the manual first forward drive range position "1", either the low-and-reverse brake 184 or the brake band 208 as well as the forward drive clutch 124 is actuated to lock the pinion carrier 174 of the second planetary gear assembly 156 or the respective sun gears 158 and 166 of the first and second planetary gear assemblies 154 and 166 depending upon the vehicle speed. If the forward drive clutch 124 and the brake band 208 are actuated in this instance, the output shaft 180 is driven to rotate in the forward direction by the pinion carrier 164 of the first planetary gear assembly 154 as in the second forward speed gear condition established with the selector lever held in the automatic forward drive range "D". If, on the other hand, the forward drive clutch 124 and the low-and-reverse brake 184 are actuated in the manual forward speed range, the output shaft 180 is driven to rotate in the forward direction about the center axis thereof by the ring gear 168 of the second planetary gear assembly 156 having the pinion carrier 174 hed stationary with respect to the gear unit housing 28, as in the first forward speed gear produced with the selector lever held in the automatic forward drive range "D". While the pinion carrier 174 is locked to the gear unit housing 28 by the action of the transmission one-way clutch 200 under the first forward speed produced in the automatic forward drive range, the pinion carrier 174 is locked to the gear unit housing 28 by means of the low-and-reverse brake 184 under the first forward speed produced in the manual first forward drive range. During the first forward speed in the manual first forward drive range, therefore a driving torque can be transmitted backwardly from the ring gear 168 to the sun gear 166 through the planet pinions 172 in the second planetary gear assembly 156 and, for this reason, the engine brake can be obtained.

The following description is directed to important portions of the unit of the transmission 36 and the final drive unit 24, to which the present invention is applicable.

A helical output gear 14 is integrally formed on the right-hand section of the output shaft 180 so as to have a common axis of rotation aligned with the center axis of the output shaft 180. As will be understood from FIG. 1B, the helical output gear 14 is situated within a chamber 218 which is defined by an extension 42 of a base wall 26a of the converter housing 26 and the flange portion 40 of the hollow stator support shaft 112. Bolts 220 are for detachably connecting the flange portion 40 to the extension 42. The flange portion 40 of the hollow stator support shaft 112 has at its left-hand end a bearing opening or bore 224 within which is situated a first thrust bearing 16a, preferably a tapered roller bearing. The flange portion 40 further has a step portion 225 from which an annular retainer 227 extends towards the face of the pump impeller 100. An oil seal 229 is disposed between the retainer 227 and a pilot sleeve 231 to which a hub portion of the pump impeller 100 is secured. Denoted by numeral 233 is a bushing for providing smooth rotation of the pump impeller 100 about the stator support hollow shaft 112. The extension 42 has at its left-hand end a bearing opening 222 within which is situated a second tapered roller thrust bearing 16b. The inner races of thrust bearings 16a and 16b rotatably support the output shaft 180. Preferably, in order to provide maximum compactness of design, the bearings 16a, 16b are directly adjacent to the opposite ends of the output gear 14. The bearings 16a, 16b are subjected to a selected level of axial preloading by introducing appropriately sized shims 40' between the flange portion 40 of the hollow stator support shaft and the base wall 26a of the converter housing 26. For reasons which will hereinafter be made clear, the loading capacity of the second bearing 16b is considerably greater than that of the first bearing 16a. In the illustrated embodiment, the second bearing 16b has an outer diameter which is greater than that of the first bearing 16a. It should be noted that a fairly large bearing having high loading capacity can be set in the extension 42 of the converter housing 26 since ample space is available for the extension 42 in the gear unit housing 28. The axial thrust to which the second unit bearing 16b is subjected is resisted exclusively by the extension 42 of the base wall 26a of converter housing 26. The gear housing 28 is thus isolated from this axial thrust. Meshing with the helical output gear 14 is a helical idler gear 18 which is supported by a pair of tapered roller bearings 20a and 20b. The inner races of these bearings 20a and 20b are concentrically mounted on a sleeve shaft 43 which is connected to the flange portion 40 of the stator support hollow shaft 112 by means of a bolt 228 passing therethrough so that the axis of the helical idler gear 18 is parallel with the axis of the output gear 14. As shown, the right-hand end of the sleeve shaft 226 is snugly received in a blind bore 230 formed in the flange portion 40 of the stator support hollow shaft 112 and the left enlarged head portion of the same is disposed in an opening 232 formed in the extension of the base wall 26a of the converter housing 26. The helical idler gear 18 is meshed with a next-mentioned externally toothed ring gear 22 forming part of the final drive unit 24. Of course, the ring gear 22 is a helical gear in accommodation with the helical idler gear 18.

The final drive unit 24 is positioned on a lateral side of the transmission 36 as is seen from FIG. 2 and comprises a final drive unit housing 38 which is integral with the converter housing 26 and encloses therein a differential gear case 234, a differential pinion shaft 236 passing through the case 234, differential pinions 238 rotatably disposed about the pinion shaft 236, and differential side gears 240 each meshing with both the differential pinions 238 as is known in the art. The case 234 has both lateral end portions on which differential side bearings 242a and 242b are mounted. The right hand bearing 242a is securely received in the bore of the housing 38, while the left hand bearing 242b is received in a drum-shaped retainer 244 which is detachably held in an opening (no numeral) formed in a laterally projected portion 28a of the gear unit housing 28. Denoted by numeral 246 is a bolt for connecting the retainer 244 to the gear unit housing 28. Extending away from the differential side gears 240 are respective axle shafts 248a and 248b. The case 234 is integrally formed with a connecting shell portion 250 which extends leftwardly in this drawing and spacedly encloses in part the drum-shaped retainer 244, as shown. The connecting shell portion 250 has at the leading end thereof a flange 256 to which the helical ring gear 22 is fixed by means of bolts 254. Now, it should be noted that the left hand bearing 242b is located adjacent the ring gear 22 in comparison with the right hand bearing 242a. Although not fully shown in FIG. 1A, the helical ring gear 22 meshes with the idler gear 18 for making up the power train between the engine and the driving road wheels of the vehicle, as is known in the art.

Figure 3:
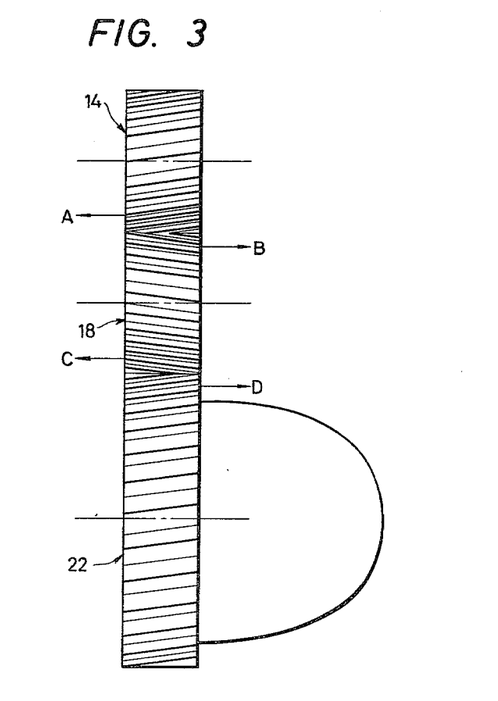
FIG. 3 is a side view of a gear train comprising output and idler gears of the transmission and a ring gear of the final drive unit.

Referring to FIG. 3 of the drawings, there is shown a gear train constructed of the helical output and idler gears 14 and 18 of the transmission 36 and helical ring gear 22 of the final drive unit 24. The adoption of the idler gear 18 causes compactness, more particularly, reduced diameters of the output gear 14 and the ring gear 22 as is known in the art. These gears are such arranged that upon rotation of the output gear 14 in the forward direction that is the direction to produce a forward drive mode of the motor vehicle, a thrust load produced as a result of the meshing engagement between the output and idler gears 14 and 18 tends to push the output gear 14 in the direction of "A" that is toward the second bearing 16b and to push the idler gear 18 in the direction of "B" that is toward the bearing 20a, and a thrust load produced between the idler and ring gears 18 and 22 tends to push the idler gear 18 in the direction of "C" that is toward the bearing 20b and to push the ring gear 22 in the direction of "D" that is rightwardly in the drawing.

The use of helical gears 14, 18 and 22 (as compared with prior art arrangements employing spur gears) reduces noise and for comparable torque requirements, also makes is possible to reduce the axis length of the output gear.

From the above, it will be appreciated that a thrust load applied to the second bearing 16b on the output gear 14 in the forward driving mode of the vehicle is greater than that applied to the first bearing 16a. However, since the second bearing 16b is constructed to have greater loading capacity as has been mentioned, the second bearing 16b endures such load. Thus the first bearing 16a endures only a relatively small thrust load, permitting compactness and reduction in size of the first bearing 16a and the flange portion 40 within which the first bearing 16b is supported. The reduction in size of the flange portion 40 of the stator support shaft permits its reduced diameter portion 225 and the heads of the bolts 220 to be brought closer to the hub portion of the pump impeller 100. This makes it possible to realize an important reduction in the longitudinal length of the transmission.

During the forward driving of the vehicle, a thrust load applied on the ring gear 22 of the final drive unit 24 is directed rightwardly in FIG. 1 to push the bearing 242a against a wall of the final drive unit housing 38. However, a radial load applied to the side bearing 242a is smaller than that to the other side bearing 242b since the bearing 242a is located away from the ring gear 22. Thus, the thrust load and the radial load applied to these two side bearings 242a and 242b are generally equalized.

From the aforementioned description, it will be appreciated that according to the present invention, not only reduction in longitudinal length of the transmission but also reliable transmittance of the revolution of the output gear 14 to the final drive unit 24 are achieved.

We claim:

1. In an automotive automatic power transmission system having a torque converter contained in a converter housing, a planetary gear system powered by the torque converter, the planetary gear system being contained in a gear housing detachably secured to the converter housing, the planetary gear system having an output shaft carrying an output gear meshing with an idler gear which is in turn in meshed relationship with a driven gear of a final drive unit, the improvement comprising: said gears being of the helical type and being rotatable about parallel axes, with a resulting axial thrust on the output shaft in a direction towards the planetary gear system during rotation of the output gear in the forward direction, said output shaft being journalled between first and second thrust bearings, said first thrust bearing being carried on a hollow member detachably fixed to the converter housing and protruding axially therein to support the torque converter stator on a one-way clutch, said second thrust bearing being radially and axially supported exclusively by said converter housing and the outer diameter of said first thrust bearing being smaller than that of said second thrust bearing.

2. The power transmission of claim 1 wherein said first and second thrust bearings are positioned directly adjacent to opposite ends of said output gear.

3. The power transmission of claims 1 or 2 wherein said first and second thrust bearings are roller bearings, the outer diameter of said second thrust bearing being greater than that of said first thrust bearing.

4. The power transmission as claimed in claim 1 wherein said hollow member is further formed with at least one portion which is received in a central recess defined by an enlarged portion of the pump impeller of the torque converter, a hub portion of said pump impeller and a pilot sleeve which is rotatably mounted on said hollow member to receive said hub portion of said pump impeller.

5. The power transmission as claimed in claim 1 wherein said final drive unit comprises a differential gear assembly and an externally toothed helical ring gear which operates said differential gear assembly when rotated about the axis thereof, said ring gear and said idler gear being meshed with each other such that a thrust load produced as a result of meshing engagement therebetween upon rotation of said output helical gear in the forward direction tends to push said idler gear towards said planetary gear element.

6. In a vehicle transmission having a hydrokinetic unit, a planetary gear unit connected to said hydrokinetic unit through an input shaft and a final drive unit operatively connected to said planetary gear unit via an output shaft, the combination of:

a first housing unit formed with integral first and and second inversely oriented bell portions, said first and second bell portions each having a mouth and a head, said first bell portion receiving said hydrokinetic unit therein and said second bell portion receiving said final drive unit therein;

a second housing unit formed with integral third bell portion and cover member, said bell portion receiving therein said planetary gear unit, said second housing unit being connectable to said first housing unit with the mouth of said third bell portion enclosing a part of the head of said first bell portion and with said cover member closing said second bell portion;

a first single piece support member for supporting said hydrokinetic unit and which is adapted to be detachably connected to the interior of said first bell portion to close off a portion of same to define a chamber in the head of said first bell portion which is inboard of said hydrokinetic unit, said first support member being formed with a through bore through which said input shaft is disposed;

means defining a first aperture in said chamber through which said input and output shafts extend;

a first bearing disposed in said chamber about said first aperture;

a second bearing disposed in the mouth of said through bore;

a hollow sleeve supported at a first end in an opening formed in said first bell portion and which extends to detachably engage said support member at the second end thereof;

third and fourth bearings disposed on said sleeve;

a helical idler gear rotatably supported on said third and fourth bearings;

a helical output gear disposed on said output shaft and within said chamber so as to be rotatably supported therein by said first and second bearings, said output gear meshing with said idler gear so that upon rotation of said output gear in a first rotational direction the output gear is subjected to an axial thrust which acts toward the head of said first bell portion; and a helical input gear of said final drive unit which meshes with said helical idler gear, said input gear upon said output gear rotating in said first rotational direction being subject to an axial thrust which acts toward the head of said second bell portion.

7. A combination as claimed in claim 6, further comprising: fifth and sixth bearings, said fifth bearing being disposed in the head of said second bell portion and said sixth bearing mounted on said cover member, said fifth and sixth bearings supporting said fnal drive unit within said second bell portion.

8. A combination as claimed in claim 6, wherein said first bearing is larger and stronger than said second bearing.

* * * * *